(12) United States Patent
Pyle et al.

(10) Patent No.: US 6,458,882 B1
(45) Date of Patent: Oct. 1, 2002

(54) SILICA REINFORCED RUBBER COMPOSITION WHICH CONTAINS NON-SILANE COUPLING AGENT AND ARTICLE OF MANUFACTURE, INCLUDING A TIRE, HAVING AT LEAST ONE COMPONENT COMPRISED OF SUCH RUBBER COMPOSITION

(75) Inventors: Kevin James Pyle, Uniontown, OH (US); Lawson Gibson Wideman, Hudson, OH (US); Paul Harry Sandstrom, Tallmadge, OH (US); Richard Robinson Smith, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 44 days.

(21) Appl. No.: 09/661,706

(22) Filed: Sep. 14, 2000

(51) Int. Cl.$^7$ .................................................. C08K 3/34
(52) U.S. Cl. ...................................................... 524/492
(58) Field of Search ......................................... 524/492

(56) References Cited

U.S. PATENT DOCUMENTS

| | | | |
|---|---|---|---|
| 5,094,829 A | 3/1992 | Krivak et al. | ................ 423/339 |
| 5,130,363 A | 7/1992 | Scholl et al. | ................ 524/392 |
| 5,605,951 A | 2/1997 | Sandstrom et al. | ......... 524/494 |
| 5,679,728 A | 10/1997 | Kawazura et al. | .......... 523/215 |
| 5,708,069 A | 1/1998 | Burns et al. | ................ 524/403 |
| 5,733,963 A | 3/1998 | Sandstrom et al. | ......... 524/492 |
| 5,750,610 A | 5/1998 | Burns et al. | ................ 524/434 |
| 5,789,514 A | 8/1998 | Burns et al. | .................. 528/12 |
| 5,859,117 A * | 1/1999 | Goerl | .......................... 524/493 |
| 5,883,139 A * | 3/1999 | Wideman | ................... 521/43.5 |
| 6,028,137 A | 2/2000 | Mahmud et al. | ............. 524/496 |
| 6,060,552 A * | 5/2000 | Kaido | ......................... 524/492 |
| 6,230,777 B1 | 5/2001 | Hedlund et al. | ............. 156/443 |

FOREIGN PATENT DOCUMENTS

| | | | |
|---|---|---|---|
| EP | 0329652 | 12/1994 | ............... C08J/5/10 |
| EP | 0780429 | 6/1997 | ........... C08K/5/372 |
| EP | 0933391 | 8/1999 | ............. C08K/3/26 |
| EP | 1031440 | 8/2000 | ............. B60C/1/00 |

* cited by examiner

*Primary Examiner*—Paul R. Michl
(74) *Attorney, Agent, or Firm*—Henry C. Young, Jr.

(57) ABSTRACT

This invention relates to a conjugated diene-based rubber composition reinforced with particulate silica-based reinforcement together with tetrathiodipropionic acid as a non-silane containing coupling agent to aid in the reinforcement of the rubber composition with a particulate silica-based material and an article of manufacture, including a tire, having at least one component comprised of such rubber composition.

20 Claims, No Drawings

SILICA REINFORCED RUBBER COMPOSITION WHICH CONTAINS NON-SILANE COUPLING AGENT AND ARTICLE OF MANUFACTURE, INCLUDING A TIRE, HAVING AT LEAST ONE COMPONENT COMPRISED OF SUCH RUBBER COMPOSITION

FIELD OF THE INVENTION

This invention relates to a conjugated diene-based rubber composition reinforced with particulate silica-based reinforcement together with tetrathiodipropionic acid as a non-silane containing coupling agent to aid in the reinforcement of the rubber composition with a particulate silica-based material and an article of manufacture, including a tire, having at least one component comprised of such rubber composition.

BACKGROUND FOR THE INVENTION

For various applications utilizing rubber compositions, carbon black and/or synthetic amorphous silica-based materials are conventionally used as particulate reinforcing fillers for the elastomer(s) of the rubber composition(s).

Often a coupling agent is used together with the silica in order to couple, or otherwise enhance, its elastomer reinforcement effect for the elastomer(s) and such use of a coupling agent is well known to those having skill in such art.

Such coupling agents might also be sometimes referred to as being adhesive agents insofar as use thereof to enhance reinforcement of various elastomer compositions with various silica-based materials such as, for example, aggregates of precipitated silica.

Historically, such coupling agents are conventionally silane-based compounds which have one moiety (a silane-based moiety such as, for example, an alkoxysilane moiety) which is reactive with hydroxyl groups (e.g. silanol groups) on the surface of a synthetic amorphous silica and having another moiety (e.g. a polysulfide bridge) which becomes interactive with a conjugated diene-based elastomer.

For example, bis-(3-trialkoxysilylpropyl) polysulfides having an average of from 2 to 4 connecting sulfur atoms in their polysulfidic bridge are often used as a coupling agent (or adhesive) to enhance coupling of synthetic amorphous silicas, such as aggregates of precipitated silica, to various conjugated diene-based elastomers. Use of such coupling agents is well known to those having skill in such art.

However, use of silane-containing coupling agents, or adhesives, which rely upon a reaction between the silane and hydroxyl groups (e.g. silanol groups) on the surface of a synthetic amorphous silica typically releases an alcohol as a by product of such reaction. For example, a reaction of a bis-(3-triethoxysilylpropyl) tetrasulfide coupling agent with silanol groups on the surface of a silica material releases ethanol as a byproduct.

For various purposes, it may be desired to reduce or substantially, or even entirely, eliminate such alcohol evolution created by an in situ reaction of said reactants, with an associated alcohol formation, within an elastomer host during the mixing of a rubber composition which contains such reactants.

In the description of this invention, the term "phr" is used to designate parts by weight of a material per 100 parts by weight of elastomer. In the further description, the terms "rubber" and "elastomer" may be used interchangeably unless otherwise mentioned. The terms "vulcanized" and "cured" may be used interchangeably, as well as "unvulcanized" or "uncured", unless otherwise indicated.

SUMMARY AND PRACTICE OF THE INVENTION

In accordance with one aspect of this invention, a rubber composition is provided which comprises (A) 100 parts by weight of at least one diene-based elastomer, (B) about 25 to about 100, optionally about 35 to about 90, phr of particulate reinforcing filler comprised of about 25 to about 100, alternately about 10 to about 70, phr of synthetic amorphous silica aggregates and, correspondingly, from zero to about 75, alternately about 10 to about 60 phr of at least one of carbon black and silica treated carbon black having domains of silica on its surface; wherein said silica aggregates and said silica domains on the surface of said treated carbon black contain hydroxyl groups (e.g. silanol groups) on their surface; and (C) a coupling agent as tetrathiodipropionic acid;

wherein said tetrathiodipropionic acid is mixed with said elastomer(s), according to one or more of the following:

(1) mixing said tetrathiodipropionic acid with said elastomer(s) and said particulate reinforcement, preferably in an internal rubber mixer, (2) mixing said tetrathiodipropionic acid with said elastomer(s) and said particulate reinforcement, preferably in an internal rubber mixer, wherein said tetrathiodipropionic acid has been pre-reacted with said carbon black to form a carbon black composite thereof, (3) mixing said tetrathiodipropionic acid with said elastomer(s) and said particulate reinforcement, preferably in an internal rubber mixer, wherein said tetrathiodipropionic acid has been pre-reacted with said silica treated carbon black to form a silica treated carbon black composite thereof, (4) mixing said tetrathiodipropionic acid with said elastomer(s) and said particulate reinforcement, preferably in an internal rubber mixer, wherein said tetrathiodipropionic acid has been pre-reacted with
 (a) a synthetic precipitated silica or
 (b) an aqueous dispersion of colloidal silica particles from which a precipitated silica is recovered to form a silica composite thereof, (5) mixing said tetrathiodipropionic acid with said elastomer(s) and said particulate reinforcement, preferably in an internal rubber mixer, according to any of said steps (1), (2), (3) or (4) wherein said particulate reinforcement includes at least one of said synthetic precipitated silica aggregates and said silica treated carbon black which has been pre-hydrophobated prior to mixing with said elastomers with an alkylsilane of the general formula (I):

$$X_n\text{—Si—}R_{4-n} \qquad (I)$$

wherein X is a radical selected from alkoxy radicals having from 1 through 3 carbon atoms, preferably selected from methoxy and ethoxy radicals, and from halogen radicals selected from at least one of chlorine and bromine radicals, preferably a chlorine radical; R is an alkyl radical having from 1 to 18 carbon atoms, preferably from 1 through 4 carbon atoms and more preferably selected from methyl and ethyl groups; and n is an integer of 1 through 3, (6) mixing said tetrathiodipropionic acid with said elastomer(s) and an alkylsilane of the said Formula (I) with said elastomer(s) and particulate reinforcement, preferably in an internal rubber mixer, and (7) mixing said tetrathiodipropionic acid and said alkylsilane of Formula (I) with said elastomer(s) and said particulate reinforcement, preferably in an internal rubber mixer, wherein said tetrathiodipropionic acid and said alkylsilane of Formula (I) have all been pre-reacted with
   (a) a synthetic precipitated silica or
   (b) an aqueous dispersion of colloidal silica particles from a which a precipitated silica is recovered to form a silica composite thereof In further accordance with this invention, an article of manufacture is provided which contains at least one component comprised of the rubber composition of this invention.

In additional accordance with this invention, a tire is provided which contains at least one component comprised of the rubber composition of this invention.

In further accordance with this invention, a tire is provided having a tread comprised of the rubber composition of this invention.

A significant aspect of this invention for the use of tetrathiodipropionic acid as a coupling agent is that the reaction, and therefore the coupling, of the terminal hydroxyl functional group of tetrathiodipropionic acid with the hydroxyl groups on the surface of the silica and/or surface of the silica of the silica treated carbon black (e.g. silanol groups) results in a formation of water instead of an alcohol.

In addition, it is contemplated that the non-silane coupler of this invention can be used in combination with a reduced amount of an alkoxysilane polysulfide coupling agent (e.g. a bis(3-ethoxysilylpropyl) disulfide or tetrasulfide) to reduce an evolution of an alcohol byproduct during the reaction thereof with hydroxyl groups (e.g. silanol groups) on the surface of a silica in the manufacture of rubber products.

The silica treated carbon black relates to carbon black which contains domains of exposed silica on the surface of the carbon black. Such carbon black may be prepared, for example, by reaction of an alkyl silane (e.g. an alkoxy silane) with carbon black or by co-fuming carbon black and silica at an elevated temperature. For example, see U.S. Pat. Nos. 5,679,728 and 6,028,137.

In one aspect of the practice of this invention, the silica, particularly precipitated silica aggregates, may reacted with, particularly pre-reacted with, the alkylsilane of formula (1), which might be considered herein as a hydrophobating agent for the silica, to hydrophobate, particularly to pre-hydrophobate, the silica. In one aspect, it is contemplated herein that the silica may be pre-hydrophobated, for example, by treating silica in an aqueous colloidal form thereof with said alkylsilane of formula (I).

The pre-hydrophobated precipitated silica aggregates might be recovered, for example, from said treated colloidal silica, for example as a treated silica hydrosol, with the aid of acid addition to the treated colloidal silica (for example, sulfuric acid or hydrochloric acid) followed by water washing and drying the recovered hydrophobated silica as a hydrophobated silica gel or as a hydrophobated precipitated silica. While this invention is not intended to be directed to a specific preparation technique (preparation of silica hydrosols, recovery of silica gels and precipitated silicas, etc.) of the pre-hydrophobated precipitated silica itself, for education purposes in this regard, reference might be made to the aforesaid Condensed Chemical Dictionary and U.S. Pat. No. 5,094,829 as well as U.S. Pat. Nos. 5,708,069, 5,789,514 and 5,750,610 for a more detailed discussion.

Representative alkylsilanes of Formula (I) are, for example, trichloro methyl silane, dichloro dimethyl silane, chloro trimethyl silane, trimethoxy methyl silane, dimethoxy dimethyl silane, methoxy trimethyl silane, trimethoxy propyl silane, trimethoxy octyl silane, trimethoxy hexadecyl silane, dimethoxy dipropyl silane, triethoxy methyl silane, triethoxy propyl silane, triethoxy octyl silane, and diethoxy dimethyl silane.

In practice, various diene-based elastomers may be used such as, for example, homopolymers and copolymers of monomers selected from isoprene and 1,3-butadiene and copolymers of at least one diene selected from isoprene and 1,3-butadiene and a vinyl aromatic compound selected from styrene and alphamethyl styrene, preferably styrene.

Representative of such conjugated diene-based elastomers are, for example, cis 1,4-polyisoprene (natural and synthetic), cis 1,4-polybutadiene, styrene/butadiene copolymers (aqueous emulsion polymerization prepared and organic solvent solution polymerization prepared), medium vinyl polybutadiene having a vinyl 1,2-content in a range of about 15 to about 90 percent, isoprene/butadiene copolymers, styrene/isoprene/butadiene terpolymers. Tin coupled elastomers may also be used, such as, for example, tin coupled organic solution polymerization prepared styrene/butadiene copolymers and isoprene/butadiene copolymers, styrene/isoprene copolymers, polybutadiene and styrene/isoprene/butadiene terpolymers.

In the further practice of this invention, particulate reinforcement for the rubber composition may be particulate synthetic amorphous silica, or a combination of carbon black and amorphous silica (exclusive of silica treated carbon black), usually of an amount in a range of about 25 to about 100 alternately about 35 to about 90, phr. If a combination of such carbon black and silica is used, usually at least about 5 phr of carbon black and at least 10 phr of silica are used. For example, a weight ratio of silica to carbon black ranging from about 1/5 to 5/1 might be used.

Commonly employed synthetic amorphous silica, or siliceous pigments, used in rubber compounding applications can be used as the silica in this invention, including precipitated siliceous pigments and fumed (pyrogenic) silica wherein aggregates of precipitated silicas are usually preferred. The precipitated silica aggregates preferably employed in this invention are precipitated silicas such as, for example, those obtained by the acidification of a soluble silicate, e.g., sodium silicate and may include co-precipitated silica and a minor amount of aluminum.

Such silicas might usually be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The silica may also be typically characterized by having a dibutylphthalate (DBP) absorption value in a range of about 50 to about 400 $cm^3/100$ g, and more usually about 100 to about 300 $cm^3/100$ g.

Various commercially available precipitated silicas may be considered for use in this invention such as, only for example herein, and without limitation, silicas from PPG Industries under the Hi-Sil trademark with designations Hi-Sil 210, Hi-Sil 243, etc; silicas from Rhodia as, for example, Zeosil 1165MP and Zeosil 165GR, silicas from Degussa AG with, for example, designations VN2 and VN3, as well as other grades of silica, particularly precipitated silicas, which can be used for elastomer reinforcement.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 1 to about 10 phr. Typical amounts of waxes comprise about 1 to about 5 phr. Often microcrystalline waxes are used. Typical amounts of peptizers comprise about 0.1 to about 1 phr.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of the above additives are not considered to be an aspect of the present invention, unless otherwise indicated herein, which is more primarily directed to the utilization a non-silane containing coupling agent, namely the tetrathiodipropionic acid, for enhancing reinforcement of a conjugated diene-based elastomer with a particulate synthetic silica material, or silica containing material for which such silica contains hydroxyl groups (e.g. silanol groups) on its surface.

The mixing of the rubber composition can be accomplished by methods known to those having skill in the rubber mixing art. For example, the ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The rubber, and fillers such as silica and silica treated carbon black and adhesive agent, are mixed in one or more non-productive mix stages. The terms "non-productive" and "productive" mix stages are well known to those having skill in the rubber mixing art.

The following examples are presented to illustrate the invention and are not intended to be limiting. The parts and percentages are by weight unless otherwise designated.

EXAMPLE I

Rubber compositions are prepared which contained cis 1,4-polyisoprene natural rubber and a solution polymerization prepared styrene/butadiene copolymer (S-SBR) with reinforcement as carbon black and silica as filler by blending the ingredients in an internal rubber mixer as outlined in Table 1 and identified herein as Samples A, B and C.

Sample A represents a Control Sample which was prepared without a coupling agent. Sample B also represents a Control Sample with a conventional coupling agent to enhance the coupling of the silica to the elastomer. Sample C contained the tetrathiodipropionic acid to illustrate a practice of this invention as a non-silane coupling or adhesive agent.

The Sample compositions were prepared by blending the elastomer and associated ingredients, without the sulfur curative and vulcanization accelerator, and without a coupling agent in an internal rubber mixer, for about 4 minutes to a temperature of about 160° C. (The first non-productive mixing step.) The resulting elastomer compositions were then mixed in an internal rubber mixer for about 2 minutes to a temperature of about 160° C. degrees during which, for Samples B and C, the coupling agent was blended. (The second non-productive mixing step). The resulting elastomer compositions were then mixed in an internal rubber mixer for about 2 minutes to a temperature of about 110° C. degrees during which the sulfur and accelerator were blended. (The productive mixing step.)

TABLE 1

| Material | Control Sample A | Control Sample B | Sample C |
|---|---|---|---|
| | Parts | | |
| First Non-Productive Mixing Step | | | |
| Natural rubber[1] | 50 | 50 | 50 |
| Styrene/butadiene rubber[2] | 50 | 50 | 50 |
| Carbon black[3] | 43 | 43 | 43 |
| Processing oil | 4 | 4 | 4 |
| Zinc oxide | 2.5 | 2.5 | 2.5 |
| Antiozonant/Antioxidant[4] | 3.27 | 3.27 | 3.27 |
| Stearic acid | 2 | 2 | 2 |
| Second Non-Productive Mixing Step | | | |
| Silane coupling agent[5] | 0 | 3.5 | 0 |
| Non-silane coupling agent[6] | 0 | 0 | 1.75 |
| Silica[7] | 17 | 17 | 17 |
| Productive Mixing Step | | | |
| Accelerator(s)[8] | 1.10 | 1.10 | 1.10 |
| Sulfur | 1.3 | 1.3 | 1.3 |

[1] Natural cis 1,4-polyisoprene rubber
[2] Styrene/butadiene rubber obtained as SLF1216 from The Goodyear Tire & Rubber Company having a styrene content of about 12 percent
[3] N330 carbon black, an ASTM designation
[4] Of the p-phenylenediamine and diaryl p-phenylenediamine type
[5] Bis (3-triethoxysilylpropyl) tetrasulfide on carbon black as a 50/50 composite thereof and therefore 50 percent active as a coupler from the Degussa company as X50S
[6] Tetrathiodipropionic acid
[7] Obtained as Hi Sil ® 210 from PPG Industries
[8] Of the sulfenamide type The Samples were cured for about 18 minutes at about 150° C. and various of the physical properties thereof are reported in the following Table 2.

TABLE 2

| Properties | Control Sample A | Control Sample B | Sample C |
|---|---|---|---|
| Rheometer | | | |
| T90 | 13.3 | 12.5 | 11.9 |
| Torque min (dNm) | 2.7 | 2.6 | 2.9 |
| Torque max (dNm) | 13.3 | 15.1 | 18 |
| Delta torque (dNm) | 10.6 | 12.5 | 15.1 |
| Modulus, MPa | | | |
| 100%, MPa | 1.7 | 2 | 2.7 |
| 300%, MPa | 9 | 11.5 | 12.9 |
| Ult tensile strength (MPa) | 17.1 | 18.3 | 17.8 |
| Ult elongation (%) | 475 | 448 | 411 |
| Hardness (Shore A) | | | |
| 23° C. | 61 | 63 | 69 |
| 100° C. | 52 | 55 | 61 |
| Rebound, % | | | |
| 23° C. | 48 | 50 | 51 |
| 100° C. | 61 | 65 | 66 |
| Tear resistance 95° C., N | 80 | 81 | 66 |
| DIN Abrasion[1] | 120 | 107 | 123 |
| E' (0° C.) (MPa) | 18.3 | 17.4 | 24.7 |
| E' (60° C.) (MPa) | 6.9 | 7.9 | 16.6 |
| Tan delta | | | |
| 0° C. | 0.17 | 0.17 | 0.15 |
| 60° C. | 0.09 | 0.09 | 0.07 |

[1] Relative volume loss whereas a lower value represents a lower volume loss and therefor a better resistance to abrasion.

It can be seen in Table 2 that the Rheometer data shows the impact of the coupling agents on delta torque, which is increased for Control Sample B and Sample C with either type of coupling agent present, as compared to Control Sample A which did not contain a coupling agent.

Higher cured 100 percent modulus and 300 percent modulus from stress-strain testing show the advantage for both of the coupling agents in Control Sample B and Sample C, as compared to the lower values for Control Sample A. It is to be appreciated that the higher modulus values are considered herein to be better for tire applications such as tire treads where tread abrasion resistance and tire handling properties are important.

Shore A hardness values also are increased for Control Sample B and Sample C, as compared to Control Sample A, which further illustrates the advantage of using the coupling agents. It is to be appreciated that use of non-silane coupling agent in Sample C presented the best hardness improvement where higher hardness values are considered herein as being better for some tire component applications where increased hardness might be desired.

Rebound properties are also improved with either of the coupling agents as illustrated in Control Sample B and Sample C, which is predictive of improved rolling resistance in a tread of such rubber composition or lower heat build-up in other tire components of such rubber composition.

Low strain stiffniess as measured by E' at 0° C. and 60° C. also shown improved performance for the non-silane coupling agent, namely the tetrathiodipropionic acid as shown for Sample C.

Tan delta values also are lower for Sample C, which is predictive of lower heat build-up and better rolling resistance for a tread of such rubber composition.

EXAMPLE II

Rubber compositions containing natural rubber and a solution SBR with silica as a reinforcing filler were prepared in a internal rubber mixer as outlined in Table 3 and identified herein as Samples D and E.

Sample D represents a Control Sample which was prepared without a coupling agent present.

Sample E was prepared with a combination of conventional organosilane polysulfide coupling agent and tetrathiodipropionic acid present to improve the interaction between the silica filler and the rubber present.

The Sample compositions were prepared by blending the elastomer and associated ingredients, without the sulfur curative and vulcanization accelerator, and coupling agents for Sample E, in an internal rubber mixer, for about 7 minutes to a temperature of about 160° C. during which the temperature was held at 160° C. for about 4 minutes (The non-productive mixing step.) The resulting elastomer compositions were then mixed in an internal rubber mixer for about 2 minutes to a temperature of about 110° C. degrees during which the sulfur and accelerator were blended. (The productive mixing step.)

TABLE 3

| Materials | Control Sample D | Sample E |
|---|---|---|
| Non-productive mixing | | |
| Natural rubber[1] | 30 | 30 |
| Styrene/butadiene rubber[2] | 70 | 70 |
| Precipitated silica[3] | 70 | 70 |
| Coupling agent A[4] | 0 | 5.5 |
| Coupling agent B[5] | 0 | 2.75 |
| Processing oil | 2.8 | 2.8 |

TABLE 3-continued

| Materials | Control Sample D | Sample E |
|---|---|---|
| Stearic acid | 3 | 3 |
| Zinc oxide | 2.5 | 2.5 |
| Productive mixing | | |
| Antioxidant[6] | 1 | 1 |
| Accelerator(s)[7] | 3.7 | 3.7 |
| Sulfur | 1.6 | 1.6 |

[1]Natural cis 1,4-polybutadiene rubber
[2]Styrene/butadiene rubber obtained as SLF1216 from The Goodyear Tire & Rubber Company
[3]Obtained as Hi Sil ® 210 from PPG Industries
[4]Bis-(3-triethoxysilylpropyl) tetrasulfide and carbon black composite in a 50/50 weight ratio and therefore 50 percent active as a coupling agent, obtained as X50S from Degussa A.G.
[5]Tetrathiodipropionic acid, as a pale light powder, synthesized from 3-mercaptopropionic acid.
[6]Of the diaryl p-phenylenediamine type
[7]Of the sulfenamide type(s)

The Samples were cured for about 18 minutes at about 150° C. and various physical properties are reported in the following Table 4.

TABLE 4

| Properties | Control Sample D | Sample E |
|---|---|---|
| Rheometer | | |
| T90 | 18 | 12 |
| Torque min (dNm) | 7.2 | 3.5 |
| Torque max (dNm) | 30.4 | 19.6 |
| Delta torque (dNm) | 23.2 | 16.1 |
| Modulus | | |
| 300% modulus, MPa | 2.1 | 8.4 |
| Ultimate Tensile strength, MPa | 12.4 | 16.4 |
| Ultimate Elongation (%) | 972 | 529 |
| Hardness (Shore A) | | |
| 23° C. | 61 | 72 |
| 100° C. | 51 | 65 |
| Rebound, % | | |
| 23° C. | 40 | 44 |
| 100° C. | 49 | 57 |
| DIN Abrasion cc loss | 191 | 115 |
| E' at 0° C. | 27.5 | 40 |
| Tan delta | .173 | .148 |
| E' at 60° C. | 18.8 | 21.4 |
| Tan delta | .107 | 0.064 |

Cured 300 percent modulus and ultimate tensile strength values from stress-strain testing show the advantage for both of the coupling agents being present in Sample E as compared to Control Sample D, since higher values are considered better for most tire applications, particularly in treads where abrasion resistance and handling properties are important.

Shore A hardness values also show an increased or improvement for the coupling agents for Sample E as compared to Control Sample D, again based on higher values being better for certain tire properties.

Rebound properties are also improved with the coupling agents as shown in Sample E as compared to Control Sample D, which is predictive of improved rolling resistance in a tread of such rubber composition or lower heat build-up in other tire component of such rubber composition.

Low strain stiffness as measured by E' at 0° C. and 60° C. also show improved performance for the coupling agents as seen in Sample E as compared to Control Sample D.

Tan delta values also are lower for Sample E as compared to Control Sample D, which is predictive of lower heat build-up and better rolling resistance for treads of such rubber composition.

Therefore, it is apparent that the non-silane coupler of this invention can be used in combination with an alkoxysilane polysulfide coupling agent to reduce an evolution of an alcohol byproduct during the reaction thereof with a silica in the manufacture of rubber products.

While various embodiments are disclosed herein for practicing the invention, it will be apparent to those skilled in this art that various changes and modifications may be made therein without departing from the spirit or scope of the invention.

What is claimed is:
1. A rubber composition which comprises a blend of:
(A) 100 parts by weight of at least one diene-based elastomer;
(B) about 25 to about 100 phr of particulate reinforcing filler comprised of about 25 to about 100 phr of synthetic amorphous silica aggregates and, correspondingly, from zero to about 75 phr of at least one of carbon black and silica treated carbon black having domains of silica on its surface;
wherein said silica aggregates and said silica domains on the surface of said treated carbon black contain hydroxyl groups (e.g. silanol groups) on their surface; and
(C) a pre-reacted tetrathiodipropionic acid;
wherein said pre-reacted tetrathiodipropionic acid is formed by pre-reacting tetrathiodipropionic acid prior to blending with said elastomer(s), according to one or more of the following:
(1) reacting tetrathiodipropionic acid with carbon black to form a carbon black composite thereof,
(2) reacting tetrathiodipropionic acid with silica treated carbon black which contains domains of silica on its surface, wherein said silica domains contain hydroxyl groups on their surface, to form a silica treated carbon black composite thereof,
(3) reacting tetrathiodipropionic acid with
   (a) a synthetic precipitated silica which contains hydroxyl groups on the surface thereof to form a silica composite thereof, or
   (b) an aqueous dispersion of colloidal silica particles, which contain hydroxyl groups on the surface thereof to form a silica composite thereof,
wherein said pre-reacted tetrathiodipropionic acid prepared according to any of said
steps (1), (2) or (3) is optionally blended with said elastomers and particulate reinforcement, wherein said particulate reinforcement includes at least one of said synthetic precipitated silica aggregates and said silica treated carbon black wherein said particulate reinforcement has been pre-hydrophobated prior to mixing with said elastomers with an alkylsilane of the general formula (I):

$$X_n\text{—Si—}R_{4-n} \tag{I}$$

wherein X is a radical selected from methoxy and ethoxy radicals, or from chlorine and bromine radicals; R is an alkyl radical having from 1 through 4 carbon atoms; and n is an integer of 1 through 3,
wherein said pre-reacted tetrathiodipropionic acid prepared according to any of the steps (1), (2) or (3) is blended with said elastomer(s) and an alkylsilane of the said Formula (I) and said particulate reinforcement, or wherein said pre-reacted tetrathiodipropionic acid prepared according to any of the steps (1), (2) or (3) is optionally blended with said alkisilane of Formula (I) with said elastomer(s) and said particulate reinforcement, wherein said alkylsilane of Formula (I) has been pre-reacted with
  (a) a synthetic precipitated silica having hydroxyl groups on its surface to form a silica composite thereof, or
  (b) an aqueous dispersion of colloidal silica particles having hydroxyl groups on its2 surface to form a silica composite thereof.

2. The rubber composition of claim 1 wherein said pre-reacted tetrathiodipropionic acid is reacted in situ with hydroxyl groups contained on the surface of said silica and said silica treated carbon black, as the case may be, within the elastomer host with an attendant evolution of water and without evolution of an alcohol.

3. The rubber composition of claim 1 wherein said silica-based filler is a synthetic amorphous silica selected from precipitated silica and fumed silica.

4. The rubber composition of claim 1 wherein said silica-based filler is a synthetic amorphous precipitated silica comprised of aggregates of precipitated silica.

5. The rubber composition of claim 1 wherein said reinforcing filler is a combination of participated silica and carbon black.

6. The rubber composition of claim 1 wherein said silica-based filler is a silica treated carbon black derived from (a) treating carbon black with an alkoxysilane or (b) co-fuming silica and carbon black at an elevated temperature.

7. The rubber composition of claim 1 wherein said pre-reacted tetrathiodipropionic acid is reacted with the surface of said silica and/or silica treated carbon black in situ within the elastomer host.

8. The rubber composition of claim 1 wherein said pre-reacted tetrathiodipropionic acid together with an alkylsilane of the said general formula (I) are reacted with the surface of said silica and/or silica treated carbon black in situ within the elastomer host.

9. The rubber composition of claim 1 wherein said pre-reacted tetrathiodipropionic acid is prepared by (1) reaction of tetrathiodipropionic acid with said aggregates of the precipitated silica or (2) reaction of tetrathiodipropionic acid with said colloidal silica particles prior or during their aggregation in the silica precipitation process.

10. The rubber composition of claim 1 wherein said pre-reacted tetrathiodipropionic acid is reacted with an alkylsilane of the said general formula (I) in situ within the elastomer host.

11. The rubber composition of claim 1 wherein said reinforcing filler is comprised of precipitated silica and carbon black exclusive of silica-treated carbon black and is comprised of at least about 5 phr of carbon black and at least 10 phr of precipitated silica.

12. The rubber composition of claim 1 wherein said diene-based elastomer(s) is selected from homopolymers and copolymers of monomers selected from isoprene and 1,3-butadiene and copolymers of at least one diene selected from isoprene and 1,3-butadiene and a vinyl aromatic compound selected from styrene and alphamethyl styrene.

13. The rubber composition of claim 1 wherein said diene-based elastomer(s) is comprised of at least one of cis 1,4-polyisoprene (natural and synthetic), cis 1,4-polybutadiene, styrene/butadiene copolymers (aqueous emulsion polymerization prepared and organic solvent solution polymerization prepared), medium vinyl polybutadiene having a vinyl 1,2-content in a range of about 15 to about 90 percent, isoprenelbutadiene copolymers, styrene/isoprene/ butadiene terpolymers and tin coupled elastomers selected from at least one of tin coupled organic solution prepared styrene/butadiene co-polymers, isoprene/butadiene copolymers, styrene/isoprene copolymers, polybutadiene and styrene/isoprene/butadiene terpolymers.

14. An article of manufacture which contains at least one component comprised of the rubber composition of claim 1.

15. A tire which contains at least one component comprised of the rubber composition of claim 1.

16. A tire having a tread comprised of the rubber composition of claim 1.

17. A tire having a tread comprised of the rubber composition of claim 2.

18. A tire having a tread comprised of the rubber composition of claim 3.

19. A tire having a tread comprised of the rubber composition of claim 4.

20. A tire having a tread comprised of the rubber composition of claim 5.

* * * * *